US009321982B2

(12) United States Patent
Goto et al.

(10) Patent No.: US 9,321,982 B2
(45) Date of Patent: Apr. 26, 2016

(54) THREADED JOINT FOR PIPES

(75) Inventors: Kunio Goto, Kobe (JP); Takayuki Kamimura, Takarazuka (JP); Masaru Takahashi, Narashino (JP); Keishi Matsumoto, Takarazuka (JP); Michihiko Iwamoto, Wakayama (JP); Ryuichi Imai, Kainan (JP); Stéphanie Raï, Marloing (FR)

(73) Assignees: NIPPON STEEL & SUMITOMO METAL CORPORATION, Tokyo (JP); VALLOUREC MANNESMANN OIL & GAS FRANCE, Aulnoye-Aymeries (FR)

( * ) Notice: Subject to any disclaimer, the term of this patent is extended or adjusted under 35 U.S.C. 154(b) by 652 days.

(21) Appl. No.: 12/793,867

(22) Filed: Jun. 4, 2010

(65) Prior Publication Data

US 2010/0301600 A1 Dec. 2, 2010

Related U.S. Application Data

(63) Continuation of application No. PCT/JP2008/071856, filed on Dec. 2, 2008.

(30) Foreign Application Priority Data

Dec. 4, 2007 (JP) ................................ 2007-313378
Oct. 17, 2008 (JP) ................................ 2008-268817

(51) Int. Cl.

| | |
|---|---|
| ***F16L 25/00*** | (2006.01) |
| ***B05D 1/02*** | (2006.01) |
| ***C10M 169/04*** | (2006.01) |
| ***C09D 5/08*** | (2006.01) |
| ***C09D 7/12*** | (2006.01) |
| ***F16L 15/00*** | (2006.01) |
| ***F16L 58/18*** | (2006.01) |
| ***E21B 17/08*** | (2006.01) |
| *C08K 5/098* | (2006.01) |

(Continued)

(52) U.S. Cl.
CPC ............... *C10M 169/04* (2013.01); *C09D 5/08* (2013.01); *C09D 7/1233* (2013.01); *E21B 17/08* (2013.01);

(Continued)

(58) Field of Classification Search
CPC .................. C10M 2205/022; C10M 2205/14; C10M 2205/16; C10M 2205/18; C10M 169/04; C10M 2201/087; C10M 2201/061; C10M 2213/062; C08K 5/098; F16L 58/182; F16L 15/004; E21B 17/08; C09D 5/08; C09D 7/1233; C10N 2250/121; C10N 2280/00
USPC ........ 428/36.9, 221, 34.1, 688; 508/100, 591; 285/333, 137, 239; 427/422, 558
See application file for complete search history.

(56) References Cited

U.S. PATENT DOCUMENTS 6,027,145 A 2/2000 Tsuru et al.
6,679,526 B2 * 1/2004 Yamamoto et al. ............ 285/55

(Continued)

FOREIGN PATENT DOCUMENTS

EP 0 329 990 8/1989
EP 1 211 451 6/2002

(Continued)

*Primary Examiner* — Gwendolyn Blackwell
*Assistant Examiner* — Kevin Ortman, Jr.
(74) *Attorney, Agent, or Firm* — Clark & Brody

(57) ABSTRACT

In a threaded joint for pipes constituted by a pin and a box, each having a contact surface comprising a threaded portion and an unthreaded metal contact portion, the contact surface of the pin has a solid corrosion protective, preferably transparent coating based on a UV-curable resin and the contact surface of the box has a solid lubricating coating having plastic or viscoplastic rheological behavior which is preferably formed by the hot melt technique from a composition comprising a thermoplastic polymer, a wax, a metal soap, a corrosion inhibitor, a water-insoluble liquid resin, and a solid lubricant.

10 Claims, 1 Drawing Sheet

3a 1 A 2 B 3b

(52) U.S. Cl.
CPC ............. *F16L 15/004* (2013.01); *F16L 58/182* (2013.01); *C08K 5/098* (2013.01); *C10M 2201/061* (2013.01); *C10M 2201/081* (2013.01); *C10M 2201/087* (2013.01); *C10M 2205/022* (2013.01); *C10M 2205/14* (2013.01); *C10M 2205/16* (2013.01); *C10M 2205/18* (2013.01); *C10M 2207/125* (2013.01); *C10M 2207/126* (2013.01); *C10M 2209/084* (2013.01); *C10M 2213/062* (2013.01); *C10N 2230/06* (2013.01); *C10N 2250/121* (2013.01); *C10N 2280/00* (2013.01)

(56) References Cited

U.S. PATENT DOCUMENTS

| | | | | |
|---|---|---|---|---|
| 6,827,996 | B2 * | 12/2004 | Goto | 428/36.9 |
| 7,360,798 | B2 * | 4/2008 | Matsumoto et al. | 285/94 |
| 7,883,118 | B2 * | 2/2011 | Goto et al. | 285/94 |
| 2003/0159764 | A1 | 8/2003 | Goto | |
| 2004/0195826 | A1 * | 10/2004 | Goto | 285/94 |
| 2004/0239105 | A1 * | 12/2004 | Matsumoto et al. | 285/94 |
| 2006/0228505 | A1 * | 10/2006 | Goto et al. | 428/36.9 |
| 2009/0220780 | A1 * | 9/2009 | Bordet et al. | 428/336 |
| 2011/0025052 | A1 * | 2/2011 | Goto et al. | 285/333 |
| 2011/0163538 | A1 * | 7/2011 | Goto et al. | 285/333 |
| 2011/0285124 | A1 * | 11/2011 | Pinel et al. | 285/94 |

FOREIGN PATENT DOCUMENTS

| | | |
|---|---|---|
| JP | 1-199088 | 8/1989 |
| JP | 2003-74763 | 3/2003 |
| JP | 2004-53013 | 2/2004 |
| JP | 3656481 | 3/2005 |
| WO | 2006/075774 | 7/2006 |
| WO | 2006/104251 | 10/2006 |
| WO | 2007/042231 | 4/2007 |

* cited by examiner

THREADED JOINT FOR PIPES

This application is a continuation of International Patent Application No. PCT/JP2008/071856, filed Dec. 2, 2008. This PCT application was not in English as published under PCT Article 21(2).

TECHNICAL FIELD

This invention relates to a threaded joint for pipes for use in connecting steel pipes and particularly oil country tubular goods (OCTG) to each other, and to a surface treatment method for the threaded joint. A threaded joint for pipes according to the present invention can reliably exhibit excellent galling resistance and corrosion resistance without application of compound grease which in the past has been applied to threaded joints for pipes when connecting oil country tubular goods to each other. Accordingly, this threaded joint for pipes can avoid the harmful effects on the global environment and humans caused by compound grease.

BACKGROUND ART

Oil country tubular goods such as tubing and casing used in the excavation of oil wells and gas wells are usually connected to each other by threaded joints for pipes. In the past, the depth of oil wells was typically 2,000-3,000 meters, but in deep oil wells such as those in recent offshore oil fields, the depth may reach 8,000-10,000 meters.

In their environment of use, threaded joints for connecting oil country tubular goods are subjected to loads such as axial tensile forces caused by the weight of the oil country tubular goods and the threaded joints for pipes themselves, the combination of internal and external pressures, and geothermal heat. Accordingly, they need to be able to maintain gastightness without undergoing damage even in such a severe environment.

A typical threaded joint for pipes used for connecting oil country tubular goods to each other has a pin-box structure. A pin is a joint component having a male thread formed on the end of an oil country tubular good, for example, and a box is a joint component having a female thread formed on the inner surface of a threaded connector (a coupling). In the case of a threaded joint referred to as a premium joint which has superior gastightness, unthreaded metal contact portions are formed at the tip of the male thread of the pin and at the base portion of the female thread of the box. The unthreaded metal contact portions can include a metal seal portion formed on a cylindrical surface of the pin or the box, and a torque shoulder which is nearly perpendicular to the axial direction of the threaded joint. When one end of an oil country tubular good is inserted into a threaded connector and the male thread of the pin and the female thread of the box are tightened, the unthreaded metal contact portions of the pin and the box are made to contact each other with a prescribed amount of interference so as to form a metal-to-metal seal and thereby provide gastightness.

During the process of lowering tubing or casing into an oil well, due to various problems, it is sometimes necessary to disconnect a joint which has been once connected, to lift it out of the oil well, to reconnect it, and then relower it. API (American Petroleum Institute) requires resistance to galling such that so-called galling or severe seizing does not occur and gastightness is maintained even if make-up (connection) and break-out (disconnection) are repeated ten times for a joint for tubing or three times for a joint for casing.

At the time of make-up, in order to increase galling resistance and gastightness, a viscous liquid lubricant which contains heavy metal powders and which is referred to as compound grease is applied to the contact surfaces (the threaded portions and the unthreaded metal contact portions of the pin and the box) of a threaded joint for pipes. Such compound grease is specified by API Bulletin 5A2. Compound grease also exhibits corrosion resistance by preventing the occurrence of rust on a contact surface to which it is applied.

It has been proposed to previously subject the contact surfaces of a threaded joint for pipes to various types of surface treatment such as nitriding, various types of plating including zinc plating and composite plating, and phosphate chemical conversion treatment to form one or more layers thereon in order to increase the retention of compound grease and improve sliding properties. However, as described below, the use of compound grease poses the threat of harmful effects on the environment and humans.

Compound grease contains large amounts of powders of heavy metals such as zinc, lead, and copper. When make-up of a threaded joint for pipes is carried out, grease which has been applied is washed off or overflows to the exterior surface, and there is the possibility of its producing harmful effects on the environment and especially on sea life, particularly due to harmful heavy metals such as lead. In addition, the process of applying compound grease worsens the work environment, and there is also a concern of harmful effects on humans.

In recent years, as a result of the enactment in 1998 of the OSPAR Convention (Oslo-Paris Convention) for preventing ocean pollution in the Northeast Atlantic, strict restrictions concerning the global environment have been imposed increasingly, and in some regions, the use of compound grease is already being restricted. Accordingly, in order to avoid harmful effects on the environment and humans in the excavation of gas wells and oil wells, a demand has developed for threaded joints for pipes which can exhibit excellent galling resistance without using compound grease.

Another problem of compound grease is that it contains a large amount of a solid lubricant typified by graphite, so the coating is not transparent. A pin which has a threaded portion on the outer surface of a pipe is more easily damaged by problems during transport or during make-up than is a box having a threaded portion on the inner surface of a pipe, so the threaded portion of a pin is often inspected for damage prior to make-up operations. When a compound grease is applied to a pin, it is necessary to wash off the applied compound grease at the time of this inspection, and then it is necessary to reapply compound grease after inspection. As described above, this operation is harmful to the environment and troublesome. If a lubricating coating is transparent, a threaded portion can be inspected for damage without removing the coating, and inspection can be made much easier.

As a threaded joint which can be used for connection of oil country tubular goods without application of a compound grease, the present inventors previously proposed in WO 2006/104251 a threaded joint for pipes in which the contact surface of at least one of a pin and a box is coated with a two-layer coating comprising a viscous liquid or semi-solid lubricating coating and atop it a dry solid coating. The dry solid coating can be formed from a coating of a thermosetting resin such as an acrylic resin or a coating of a UV-curable resin. The viscous liquid or semi-solid lubricating coating is tacky and foreign matter easily adheres to it, but by forming a dry solid coating atop it, tackiness is eliminated. The dry solid coating is broken at the time of make-up of a threaded joint, so it does not interfere with the lubricating properties of the lubricating coating beneath it. This threaded joint for pipes has excellent lubricating properties and sufficient galling resistance, but it is necessary to form a two-layer structure of the lubricating coating and the dry solid coating, so costs become high. In addition, when the two-layer structure is broken at the time of make-up, flakes are formed, and its subsequent appearance is not very good. In addition, the coating has low transparency.

In WO 2007/042231, the present inventors disclosed a threaded joint for pipes in which a thin lubricating coating which is not tacky and which has solid lubricant particles dispersed in a solid matrix exhibiting plastic or viscoplastic rheological properties (flow behavior) is formed on the threaded portions of a pin and a box. The melting point of the matrix is preferably in the range of 80-320° C., and it is formed by spray coating in melt (hot melt spraying), flame coating using powders, or spray coating of an aqueous emulsion. The composition used in the hot melt method contains, for example, polyethylene as a thermoplastic polymer, a wax (such as carnauba wax) and a metal soap (such as zinc stearate) as lubricating components, and a calcium sulfonate as a corrosion inhibitor. This threaded joint for pipes has excellent lubricating properties and corrosion resistance. However, since the coating is not transparent, it is difficult to perform inspection for damage of the threads on the outer surface of the pin in preparation for situations in which galling suddenly occurs due to damage to the threads on the outer surface of the pin.

In WO 2006/75774, a threaded joint for pipes is disclosed in which the contact surface of at least one of a pin and a box is coated with a two-layer coating comprising a solid lubricating coating containing a lubricating powder and a binder, and atop it a solid corrosion protective coating which does not contain solid particles. This threaded joint for pipes has extremely high corrosion resistance, but the solid lubricating coating is a rigid solid coating having substantially no plastic or viscoplastic rheological properties. Therefore, even if the solid corrosion protective coating formed atop it is broken at the time of make-up of a threaded joint, it is difficult for the broken pieces to be embedded in the underlying solid lubricating coating, and its lubricating properties are relatively poor.

DISCLOSURE OF INVENTION

The object of the present invention is to provide a threaded joint for pipes which suppresses the formation of rust and exhibits excellent galling resistance and gastightness without using a compound grease and which has a single layer of a surface treatment coating formed on each of a pin and a box, the coating having a nontacky surface and good appearance and allowing ease of inspection, and a surface treatment method therefor.

The above-described object is achieved by coating the contact surface of a pin with a solid corrosion protective coating based on a UV-curable resin and coating the contact surface of a box with a solid lubricating coating which has plastic or viscoplastic rheological properties and which does not flow under normal pressure but can flow under a high pressure (such as one formed from a hot melt composition).

The present invention is a threaded joint for pipes constituted by a pin and a box, each having a contact surface comprising a threaded portion and an unthreaded metal contact portion, characterized in that the contact surface of the box has a solid lubricating coating having plastic or viscoplastic rheological behavior as an uppermost layer, and the contact surface of the pin has a solid corrosion protective coating based on a UV-curable resin as an uppermost layer.

The "solid" lubricating coating and the "solid" corrosion protective coating indicate that these coatings are solid at ambient temperature and specifically herein that they are solid at a temperature not higher than 40° C.

From another standpoint, the present invention is a surface treatment method for a threaded joint for pipes constituted by a pin and a box, each having a contact surface comprising a threaded portion and an unthreaded metal contact portion, characterized by forming a solid lubricating coating having plastic or viscoplastic rheological properties on the contact surface of the box, and forming a solid corrosion protective coating on the contact surface of the pin by application of a composition based on a UV-curable resin followed by irradiation with UV rays.

Some preferred embodiments of the present invention include the following:

- the solid corrosion protective coating is formed from two or more layers each based on a UV-curable resin;
- the contact surface of at least one of the pin and the box previously undergoes preparatory surface treatment by a method selected from blasting, pickling, phosphate chemical conversion treatment, oxalate chemical conversion treatment, borate chemical conversion treatment, metallic plating, or a combination of two or more of these methods;
- the solid lubricating coating is formed by spray coating of a molten composition;
- the composition comprises a thermoplastic polymer, a wax, a metal soap, and a solid lubricant;
- the composition further contains a corrosion inhibitor;
- the composition further contains a corrosion inhibitor and a water-insoluble liquid resin;
- in addition to a UV-curable resin, the solid corrosion protective coating contains a lubricant, a fibrous filler, and/or a rust-preventing agent;
- the lubricant is a wax;
- in addition to a UV-curable resin, the solid corrosion protective coating contains at least one additive selected from a pigment, a dye, and a fluorescent agent;
- the threaded joint for pipes is used for connecting oil country tubular goods to each other.

According to the present invention, by coating the contact surface (the threaded portion and the unthreaded metal contact portion) of a pin, which is one component of a threaded joint for pipes having a pin-box structure, with a solid corrosion protective coating based on a UV-curable resin and by coating the contact surface of a box, which is the other component of the joint, with a solid lubricating coating having plastic or viscoplastic rheological properties and capable of flowing under a high surface pressure such as a hot melt-type coating, sufficient corrosion resistance and galling resistance (lubricating properties) can be imparted to the contact surfaces of a threaded joint for pipes just by forming a relatively inexpensive surface treatment coating in the form of a single layer on each contact surface without application of a compound grease.

Thus, due to the ability of the above-described solid lubricating coating to flow under a high pressure, although it is applied to only the contact surface of a box, it exhibits high lubricating performance, and galling of a threaded joint for pipes can be prevented even when make-up and break-out are repeated. The solid corrosion protective coating based on a UV-curable resin (comprising predominantly a UV-curable resin) formed on the contact surface of a box is hard, and when the pin having this coating is tightened to the box having the above-described lubricating coating, it does not adversely affect the galling resistance of the threaded joint for pipes.

The solid corrosion protective coating based on a UV-curable resin is highly transparent. Therefore, inspection for damage of a threaded portion of a pin which can easily undergo external damage can be performed without removing the surface treatment coating, and the burden of inspecting threads before make-up can be greatly reduced.

The solid lubricating coating having the above-described rheological properties such as one of the hot melt type and, of course, the solid corrosion protective coating each have a non-tacky surface. Therefore, even if foreign matter such as rust, oxide scale, abrasive particles for blasting, and the like adheres to the contact surfaces of the threaded joint prior to make-up of the threaded joint, just the foreign matter can be easily removed by a method such as air blowing. As a result, even under conditions in which the surface pressure locally becomes excessive due to eccentricity of the threaded joint, leaning, the intrusion of foreign matter, and the like due to problems in assembly at the time of make-up of a threaded joint and plastic deformation results, galling can be prevented. In addition, the formation of flakes at the time of make-up can be suppressed.

BEST MODE FOR CARRYING OUT THE INVENTION

Below, an embodiment of a threaded joint for pipes according to the present invention will be explained in detail.

Figure 1:
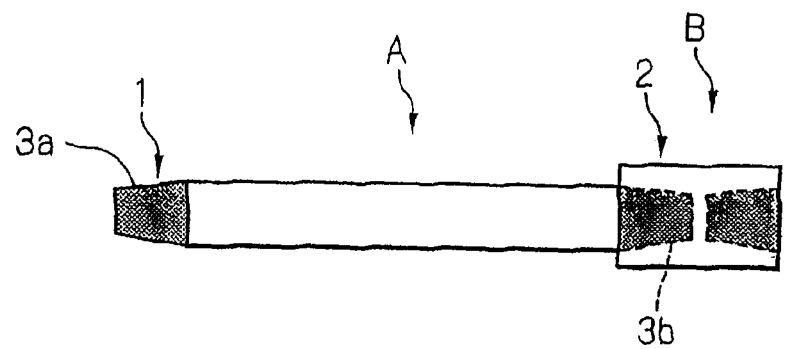
FIG. 1 schematically shows the assembled structure of a steel pipe and a coupling at the time of shipment of the steel pipe.

FIG. 1 schematically shows the assembled structure of a typical threaded joint for pipes showing the state of a steel pipe for oil country tubular goods and a threaded connector at the time of shipment. A pin 1 having a male threaded portion 3*a* on its outer surface is formed on both ends of a steel pipe A, and a box 2 having a female threaded portion 3*b* on its inner surface is formed on both sides of a threaded connector (a coupling). A pin refers to a threaded joint component having a male thread formed on the end of a first tubular member (a steel pipe in the illustrated example), and a box refers to a threaded joint component having a female thread formed on the end of a second tubular member (a coupling in the illustrated example). The coupling B is previously connected to one end of the steel pipe A. Although not shown, prior to shipment, a protector for protecting the threaded portion is mounted on each of the unconnected pin of the steel pipe and the unconnected box of the coupling B. The protector is removed prior to use of the threaded joint.

Typically, as shown in the figure, a pin is formed on the outer surface of both ends of a steel pipe, and a box is formed on the inner surface of a separate member in the form of a coupling. However, conversely, it is theoretically possible to make the inner surface of both ends of a steel pipe a box and to make the outer surface of a coupling a pin. In addition, there are also integral threaded joints for pipes which do not use a coupling and in which a pin is formed on one end and a box is formed on the other end of a steel pipe. In this case, the first tubular member is a first steel pipe and the second tubular member is a second steel pipe. A threaded joint for pipes according to the present invention may be any of these types. Below, the present invention will be explained while taking as an example a threaded joint for pipes of the type shown in FIG. 1 in which a pin is formed on the outer surface of both ends of a steel pipe and a box is formed in the inner surface of a coupling.

Figure 2:
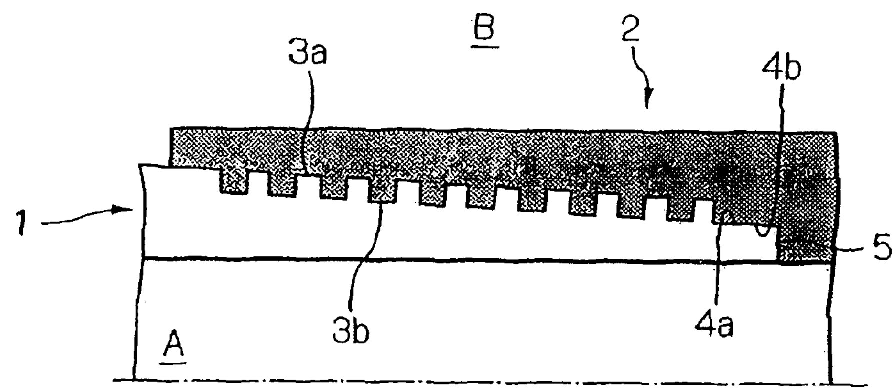
FIG. 2 schematically shows the connecting portion of a threaded joint for pipes.

FIG. 2 schematically shows the structure of a threaded joint for pipes. The threaded joint for pipes is constituted by a pin 1 formed on the outer surface of the end of a steel pipe A and a box 2 formed on the inner surface of a coupling B. The pin 1 has a male threaded portion 3*a*, and at the end of the steel pipe it has a metal sealing surface 4*a* and a torque shoulder 5. Correspondingly, the box 2 has a female threaded portion 3*b*, and a metal sealing surface 4*b* and a torque shoulder 5 on the inner side of the threaded portion. The metal sealing surface and the torque shoulder of each of the pin and the box constitute an unthreaded metal contact portion.

The threaded portions 3*a* and 3*b*, the metal sealing surfaces 4*a* and 4*b*, and the torque shoulders 5 of the pin 1 and the box 2 are the contact surfaces of the threaded joint for pipes. These contact surfaces need to have galling resistance, gastightness, and corrosion resistance. In the past, for these purposes, application of compound grease containing heavy metal powders was carried out, but as stated above, compound grease has problems with respect to its effects on humans and the environment, and it had problems with respect to galling resistance in actual use due to a decrease in performance during storage or due to adhesion of foreign matter. In addition, at the time of inspection of threaded portions before make-up, it was necessary to wash off the compound grease and then reapply it after inspection.

Figure 3:
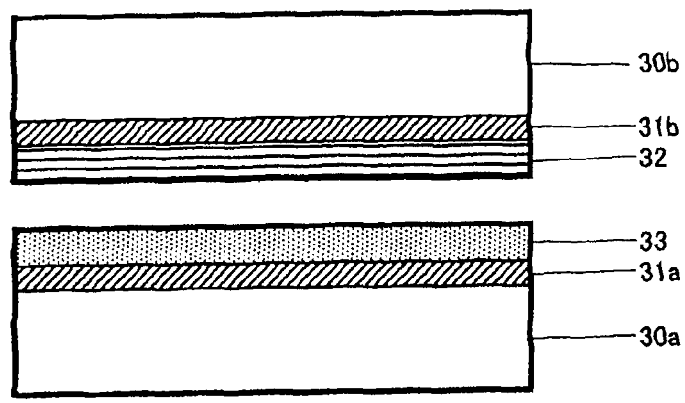
FIG. 3 is a schematic view showing a coating formed on a contact surface of a threaded joint for pipes according to the present invention, FIG. 3(*a*) showing an example in which the contact surface itself has undergone surface roughening, and FIG. 3(*b*) showing an example of forming a preparatory surface treatment coating for surface roughening atop the contact surface.

According to the present invention, as shown in FIG. 3 with respect to the metal sealing surface, the contact surface of a pin may optionally have a preparatory surface treatment layer 31*a* for the purpose of surface roughening of a base steel 30*a*, and atop this is formed a solid corrosion protective coating 32 based on a UV-curable resin. The solid corrosion protective coating 32 may be constituted by two or more layers based on a UV-curable resin. The contact surface of a box may optionally have a preparatory surface treatment layer 31*b* for the purpose of surface roughening of a base steel 30*b*, and a solid lubricating coating 33 is formed atop it. In the present invention, the solid lubricating coating is a coating having plastic or viscoplastic rheological behavior. A coating such a rheological behavior does not flow at a normal pressure but becomes fluid under a high pressure. Namely, the fluidity of the coating significantly varies depending on the pressure. A coating having such properties can be formed by applying a hot melt-type composition, namely, a molten composition containing a thermoplastic polymer with a spray gun.

The solid corrosion protective coating and the solid lubricating coating should cover the entirety of the contact surfaces of the pin and the box, respectively, but the case in which only a portion of the contact surfaces (such as only the unthreaded metal contact portions) of the pin and/or box is coated with such a coating is encompassed by the present invention.

[Preparatory Surface Treatment]

The threaded portions and the unthreaded metal contact portions which constitute the contact surfaces of a threaded joint for pipes are formed by machining including thread cutting, and their surface roughness is generally around 3-5 μm. If the surface roughness of the contact surfaces is made larger than this, the adhesion of a coating formed atop them can be increased, and as a result, properties such as galling resistance and corrosion resistance can be improved. For this purpose, prior to forming a coating, preparatory surface treatment which can increase the surface roughness is preferably carried out on the contact surface of at least one of the pin and the box and preferably on both.

Examples of such surface treatment include blasting treatment comprising shooting of a blasting material such as shot having a spherical shape or grit having an angular shape, or pickling in which the skin is roughened by immersion in a solution of a strong acidic such as sulfuric acid, hydrochloric acid, phosphoric acid, or hydrofluoric acid. These are treatments which can increase the surface roughness of the base steel itself.

Examples of other preparatory surface treatment methods are chemical conversion treatment methods such as phosphate chemical conversion treatment, oxalate chemical conversion treatment, and borate chemical conversion treatment as well as metallic plating.

Chemical conversion treatment increases the surface roughness by forming a chemical conversion coating of acicular crystals which has high surface roughness, and hence can increase the adhesion of a solid corrosion protective coating or a solid lubricating coating formed atop it.

Metallic plating can increase galling resistance, and some types of metallic plating can also increase surface roughness. Examples of metallic plating which can increase surface roughness are plating of copper, iron, and alloys thereof by the electroplating method, zinc or zinc alloy impact plating in which particles having an iron core coated with zinc, a zinc-iron alloy, or the like are propelled by centrifugal force or air pressure to accumulate the zinc or zinc-iron alloy particles so as to form a porous metal coating, and composite metallic plating in which a coating having solid minute particles dispersed in a metal is formed, In either of the methods of preparatory treatment of the contact surfaces, the surface roughness Rz obtained by roughening by the preparatory surface treatment is preferably 5-40 μm. If Rz is less than 5 μm, the adhesion of a coating formed atop it may become inadequate. On the other hand, if Rz exceeds 40 μm, the surface has an increased friction, and it may not be possible for the coating formed thereon to withstand the shearing forces and compressive forces which the coating receives when a high pressure is applied to the surface, and breakdown or peeling of the coating may easily occur. Two or more types of preparatory surface treatment may be carried out for surface roughening. In addition, different types of preparatory surface treatment may be performed on the pin and the box.

From the standpoint of the adhesion of a solid corrosion protective coating or a solid lubricating coating, preparatory surface treatment which can form a porous coating is preferred. In particular, phosphate treatment using manganese phosphate, zinc phosphate, iron-manganese phosphate, or zinc-calcium phosphate or formation of a zinc or zinc-iron alloy coating by impact plating is preferred as preparatory surface treatment. A manganese phosphate coating is preferred from the standpoint of adhesion of the coating formed atop it, while a zinc or zinc-iron alloy coating which can be expected to provide a sacrificial corrosion protective effect by zinc is preferred from the standpoint of corrosion resistance.

Manganese phosphate chemical conversion treatment is particularly preferred as a preparatory surface treatment for a solid lubricating coating, and zinc phosphate chemical conversion treatment and impact plating with zinc or a zinc-iron alloy is preferred as preparatory surface treatment for a solid corrosion protective coating.

Both a coating formed by phosphating and a zinc or zinc-iron alloy coating formed by impact plating are porous. Therefore, if a solid corrosion protective coating or a solid lubricating coating is formed atop such a coating, the adhesion of the coating is increased by the so-called "anchor effect" of a porous coating. As a result, it becomes difficult for peeling of the solid lubricating coating to occur even if make-up and break-out are repeated, and direct contact between metal surfaces is effectively prevented, and galling resistance, gastightness, and corrosion resistance are all the more improved.

Phosphating can be carried out by immersion or spraying in a conventional manner. An acidic phosphating solution which is commonly used prior to zinc plating can be used as a solution for treatment. By way of example, a zinc phosphating solution which contains 1-150 g/L of phosphate ions, 3-70 g/L of zinc ions, 1-100 g/L of nitrate ions, and 0-30 g/L of nickel ions can be used. A manganese phosphating solution which is conventionally used for threaded joints for pipes can also be used. The temperature of the solution during treatment can be from room temperature to 100° C. The duration of treatment may be set depending on the desired coating thickness to be formed, and it is normally up to 15 minutes. In order to promote the formation of a phosphate coating, the surface to be treated may be pretreated with an aqueous solution containing colloidal titanium for surface modification prior to phosphating. After phosphating, it is preferable to perform rinsing with water or warm water followed by drying.

Impact plating can be carried out by mechanical plating in which the plating particles and the material to be plated are impacted with each other in a rotating barrel, and blast plating in which a blasting device is used to blow the plating particles against the material to be plated. In the present invention, since it is sufficient to plate only a contact surface, it is preferable to use blast plating which can perform localized plating.

Blast plating can be performed using, for example, plating particles having an iron-based core coated with a surface layer of zinc or a zinc alloy (such as a zinc-iron alloy) as blasting particles which are impacted against the contact surface to be coated. The content of zinc or a zinc alloy in the particles is preferably in the range of 20-60 mass %, and the diameter of the particles is preferably in the range of 0.2-1.5 mm. As a result of blasting, only the surface layers of zinc or a zinc alloy of the particles adhere to the contact surface which is the substrate to be coated, so a porous coating of zinc or a zinc alloy is formed on the contact surface. This blast plating technique can form a plated coating having good adhesion to a steel surface regardless of the composition of the steel.

From the standpoints of corrosion prevention and adhesion, the thickness of the zinc or zinc alloy layer formed by impact plating is preferably 5-40 μm. If it is less than 5 μm, adequate corrosion resistance is not guaranteed in some cases. On the other hand, if it exceeds 40 μm, adhesion of the coating formed thereon tends to decrease. Similarly, the thickness of a phosphate coating is preferably in the range of 5-40 μm.

A surface treatment method which is effective for increasing galling resistance when used as a preparatory surface treatment prior to the formation of a solid lubricating coating can also be employed. For example, plating with one or more layers of a metal or an alloy is effective in improving galling resistance. Examples of such plating are single layer plating of Cu, Sn, or Ni, or as disclosed in JP 2003-74763 A, single layer plating with a Cu—Sn alloy, two-layer plating with a Cu layer and a Sn layer, and three-layer plating with a layer of each of Ni, Cu, and Sn. With a steel pipe made from a steel having a Cr content of at least 5%, Cu—Sn alloy plating, two-layer plating of Cu plating and Sn plating, and three-layer plating of Ni plating-Cu plating-Sn plating are preferred. More preferred are two-layer plating of Cu plating and Sn plating, three-layer plating of Ni strike plating-Cu plating-Sn plating, and plating of a Cu—Sn—Zn alloy. Such metal or metal alloy plating can be carried out by the method described in JP 2003-74763 A. An example of plating which is preferred regardless of the steel type of a threaded joint for pipes (carbon steel, alloy steel, high alloy steel) can be peformed by Ni strike plating followed by Cu plating, Cu—Sn alloy plating, or Cu—Sn—Zn alloy plating to form plating layers having a total thickness of 5-15 μm. When galling resistance is desired in a more severe use environment, plating as preparatory surface treatment is most preferably carried out by Ni strike plating followed by Cu—Sn—Zn alloy plating.

[Solid Corrosion Protective Coating]

The contact surface of a pin is preferably subjected to preparatory surface treatment as described above, particularly by zinc phosphate chemical conversion treatment or by impact plating to form a porous zinc or zinc alloy plated layer. Thereafter, a solid corrosion protective coating based on a UV-curable resin is formed on the contact surface of the pin as an uppermost layer.

As described above with respect to FIG. 1, a protector is often mounted on the unconnected pin and box of a threaded joint for pipes until the joint is actually used. The solid corrosion protective coating needs to be one which is not destroyed or broken by the force applied at the time of mounting of a protector, which is not dissolved when exposed to water which condenses due to the dew point during transport or storage, and which does not easily soften even at a temperature exceeding 40° C.

In the present invention, in order to form a coating satisfying these properties, a solid corrosion protective coating is formed from a composition based on a UV-curable resin, which is known to form a high-strength coating. A known resin coating composition comprising at least a monomer, an oligomer, and a photopolymerization initiator can be used as a UV-curable resin. There are no particular limitations on the components and composition of a UV-curable resin composition as long as a photopolymerization reaction occurs under irradiation with ultraviolet light to form a cured coating.

Some non-limiting examples of monomers are poly (di-, tri-, or higher) esters of polyhydric alcohols with a (meta) acrylic acid as well as various (meta)acrylate compounds, N-vinylpyrrolidone, N-vinylcaprolactam, and styrene. Some non-limiting examples of oligomers are an epoxy (meta)acrylate, urethane (meta)acrylate, polyester (meta)acrylate, polyether (meta)acrylate, and silicone (meta)acrylate.

A useful photopolymerization initiator is a compound having absorption at a wavelength of 260-450 nm such as benzoin and its derivatives, benzophenone and its derivatives, acetophenone and its derivatives, Michler's ketones, benzil and its derivatives, tetraalkylthiuram monosulfide, and thioxanes. It is particularly preferable to use a thioxane.

From the standpoint of sliding properties, coating strength, and corrosion resistance, a solid corrosion protective coating formed from a UV-curable resin may contain additives selected from lubricants, fibrous fillers, and rust-preventing agents.

Examples of lubricants are waxes, metal soaps such as calcium stearate and zinc stearate, and polytetrafluoroethylene (PTFE). An example of fibrous fillers is acicular calcium carbonate such as "Whiscal" manufactured by Maruo Calcium Co. Ltd. One or more of these additives can be added such that the mass ratio of these additives (total amount if two or more are used) to the UV-curable resin is 0.05-0.35. If the mass ratio is 0.05 or less, improvement in sliding properties or coating strength may be inadequate. On the other hand, if it exceeds 0.35, the viscosity of a coating composition may so increase that coatabilty worsens, and there are cases in which the resulting coating has a decreased strength.

Examples of a rust-preventing agent are aluminum tripolyphosphate and aluminum phosphite. These additives can be added in a mass ratio of at most approximately 0.10 with respect to the UV-curable resin.

A solid corrosion protective coating formed from a UV-curable resin is mostky transparent. From the standpoint of ease of quality inspection by visual observation or image processing of the solid corrosion protective coating which is formed (inspection as to whether the coating is present, the uniformity or unevenness of the coating thickness, and the like), the solid corrosion protective coating may contain at least one additive for coloring the coating under visible light or ultraviolet light. The additive which is used can be selected from pigments, dyes, and fluorescent agents. Fluorescent agents sometimes cannot give color to a coating under visible light, but they make the coating fluoresce under at least ultraviolet light and give it color. These coloring additives may be commercial products, and there is no particular limitation thereon as long as quality inspection of the solid corrosion protective coating is possible by visual observation or image processing. An organic or inorganic material can be used.

If a pigment is added, the transparency of a solid corrosion protective coating decreases or is lost. If a solid corrosion protective coating becomes opaque, it becomes difficult to perform inspection for the presence of damage of the underlying threaded portion of the pin. Accordingly, when a pigment is used, it is preferably a pigment having a color with a high degree of brightness such as yellow or white. From the standpoint of corrosion prevention, the particle size of the pigment is preferably as small as possible, and it is preferable to use a pigment with an average particle diameter of at most 5 μm. A dye does not greatly decrease the transparency of a solid corrosion protective coating, so there is no problem with using a dye having a strong color such as red or blue. The mass ratio of the added amount of pigment and dye with respect to the UV-curable resin is preferably at most 0.05. If the mass ratio exceeds 0.05, the coating may have decreased corrosion protecting properties. A more preferred mass ratio is at most 0.02.

A fluorescent agent may be a fluorescent pigment, a fluorescent dye, and a phosphor material used in fluorescent paints. Fluorescent pigments can be generally categorized as inorganic fluorescent pigments and daylight fluorescent pigments.

Examples of an inorganic fluorescent pigment are the zinc sulfide or zinc cadmium sulfide type (containing a metal activator), the haloganated calcium phosphate type, and the rare earth-activated strontium chloroapatite type. Two or more of these types are often mixed and used in combination. An inorganic fluorescent pigment has excellent durability and heat resistance.

There are also a number of types of daylight fluorescent pigments. The most common type is the synthetic resin solid solution type in which a fluorescent dye is contained in a synthetic resin and pulverized to form a pigment. A fluorescent dye itself can be used. Various types of inorganic or organic fluorescent pigments, particularly those of the synthetic resin solid solution type are used as phosphor materials in fluorescent paints and fluorescent printing ink, and the phosphor materials contained in these paints or ink can be used as a fluorescent pigment or dye.

A solid corrosion protective coating containing a fluorescent agent is colorless or has a transparent color under visible light, but if it is irradiated with a black light or ultraviolet rays, it fluoresces and becomes colored, so the presence or absence of a coating and unevenness in coating thickness can be ascertained. In addition, since it is transparent under visible light, the substrate surface beneath the solid corrosion protective coating, namely, the pin surface can be observed. Accordingly, the solid corrosion protective coating does not interfere with the inspection of damage of the threaded portion of the pin.

The amount of a fluorescent agent which is added to a solid corrosion protective coating is such that the mass ratio with respect to the UV-curable resin is preferably a maximum of approximately 0.05. If it exceeds 0.05, the coating may have a decreased corrosion resistance. A more preferable mass ratio is at most 0.02.

In order to make it possible to perform quality inspection not only of the solid corrosion protective coating but also of the underlying threaded portion of the pin, it is preferable to use a fluorescent agent and particularly a fluorescent pigment as a coloring additive for the coating.

After a composition based on a UV-curable resin (including a composition consisting solely of a UV-curable resin) is applied to the contact surface of a pin, it is irradiated with ultraviolet light to cure the coating and form a solid corrosion protective coating based on a UV-curable resin layer.

By repeating application and irradiation with ultraviolet light, a solid corrosion protective coating comprising two or more layers of a UV-curable resin can be formed. By forming a solid corrosion protective coating as multiple layers in this manner, the strength of the solid corrosion protective coating is further increased such that it cannot be destroyed under the force applied during make-up of the threaded joint, whereby the corrosion resistance of the threaded joint is further improved. In the present invention, a lubricating coating is not present beneath the solid corrosion protective coating, so it is not necessary to break down the solid corrosion protective coating during make-up of the threaded joint to expose a lubricating coating. Indeed, retention of the solid corrosion protective coating without breakdown leads to an increase in the corrosion resistance of the threaded joint.

Irradiation with ultraviolet light can be carried out using an ordinary commercially available ultraviolet light irradiating apparatus having an output wavelength of 200-450 nm. Examples of a source of ultraviolet light are high pressure mercury vapor lamps, extra high pressure mercury vapor lamps, xenon lamps, carbon arc lamps, metal halide lamps, and sunlight. The duration of irradiation and the intensity of irradiated ultraviolet light can be suitably set by one skilled in the art.

The thickness of a solid corrosion protective coating (the total thickness when there are two or more layers of UV-curable resin coating) is preferably in the range of 5-50 μm and more preferably in the range of 10-40 μm. It is preferably smaller than the thickness of the solid lubricating coating formed on the box. If the thickness of a solid corrosion protective coating is too small, it does not adequately function as a corrosion protective coating, and the corrosion resistance of a threaded joint for a steel pipe sometimes becomes inadequate. On the other hand, if the thickness of the solid corrosion protective coating becomes larger than 50 μm, when mounting a protective member such as a protector having a high degrees of gastightness on the end of a steel pipe as shown in FIG. 1, the solid corrosion protective coating is sometimes destroyed at the time of mounting of the protector, and the corrosion resistance of the threaded joint become inadequate. In addition, if the thickness of the solid corrosion protective coating is larger than the thickness of the solid lubricating coating on the opposing member, it sometimes interferes with the lubricating properties of the lubricating coating.

A solid corrosion protective coating based on a UV-curable resin is mostly transparent, so the condition of the underlying base metal can be observed without removing the coating, and inspection of the threaded portion prior to make-up can be carried out from atop the coating. Accordingly, by forming this solid lubricating coating on the contact surface of a pin which has a thread formed on its outer surface and which is more easily damaged, the presence or absence of damage to the thread portions of the pin can be easily observed with the coating in place.

[Solid Lubricating Coating]

In order to prevent galling at the time of connection of steel pipes using a threaded joint for pipes, a solid lubricating coating is formed on the contact surface of the box of the threaded joint for pipes. In the present invention, this solid lubricating coating is a coating which exhibits plastic or viscoplastic rheological behavior at room temperature as typified by a hot melt coating instead of a more typical solid lubricating coating comprising a solid lubricant dispersed in a matrix of a thermosetting resin.

This type of solid lubricating coating is described in above-mentioned WO 2007/042231. It is a coating in which a small amount of solid lubricant is dispersed in a matrix having plastic or viscoelastic rheological behavior. As described in that patent document, this type of solid lubricating coating can be formed by application of an aqueous emulsion followed by drying or by flame spray coating. However, a preferred method of forming a solid lubricating coating is a method in which a coating composition is applied in a molten state by spraying.

A preferred solid lubricating coating comprises 70-95 mass percent of a matrix and 5-30 mass percent of a lubricating powder. Thus, because the proportion of the lubricating powder is small, the plastic or viscoplastic rheological properties of the matrix are exhibited in the coating as a whole.

The matrix of this solid lubricating coating (which exhibits plastic or viscoplastic rheological behavior at room temperature) preferably has a melting point in the range of 80-320° C. As a result, by performing spray coating using an ordinary spray gun of a molten composition at a temperature of at least the melting point of the matrix, a solid lubricating coating can be formed on the contact surface of the box.

This matrix preferably comprises a thermoplastic polymer, a wax, and a metal soap, and more preferably it further contains a corrosion inhibitor and a water-insoluble resin.

A thermoplastic polymer used in the matrix is preferably polyethylene. Polyethylene has a relatively low melting point, so spray coating in the form of a hot melt can be carried out at a temperature of 150° C. or below, and it results in the formation of a coating having excellent lubricating properties.

In the present invention, a metal soap is a salt of a higher fatty acid (a fatty acid having at least 12 carbon atoms) with a metal other than an alkali metal. A metal soap has the effect of capturing broken pieces which are formed at the time of make-up or break-out of a threaded joint and suppressing their release into the outside environment. In addition, it gives the coating good sliding properties, decreases the coefficient of friction, and improves lubricating properties. In addition, a metal soap has a corrosion suppressing effect in that it delays the time until the occurrence of corrosion in a salt spray test. Preferred metal soaps are zinc stearate and calcium stearate.

Wax performs a function like that of a metal soap. Accordingly, it is possible to include a single one of either a metal soap and a wax in a solid lubricating coating, but a solid lubricating coating which contains both a metal soap and wax is preferable because the coating has better lubricating properties. Wax has a low melting point, so it has the advantage that it decreases the melting point of the coating composition and therefore the temperature of spray coating.

The wax can be an animal wax, a vegetable wax, a mineral wax, or a synthetic wax. Examples of a wax which can be used include beeswax and whale tallow (animal waxes); Japan wax, carnauba wax, candelilla wax, and rice wax (vegetable waxes); paraffin wax, microcrystalline wax, petrolatum, montan wax, ozokerite, and ceresin (mineral waxes); oxide wax, polyethylene wax, Fischer-Tropsch wax, amide wax, and hardened castor oil (castor wax) (synthetic waxes). Carnauba wax is particularly preferred, but other waxes may also be used.

The mass ratio of the wax with respect to the metal soap is preferably in the range of 0.5-3, more preferably 0.5-2, and most preferably approximately 1.

Preferred corrosion inhibitors are those types which have been conventionally added to lubricating oils as corrosion inhibitors on account of their excellent lubricating properties. A representative example of this type of corrosion inhibitor is a calcium sulfonate derivative sold by the Lubrizol Corporation under the product name Alox™ 606, strontium zinc phosphosilicate sold by Halox under the product name Halox™ SZP-391, NA-SUL™ Ca/W1935 sold by King Industries, Inc, and the like. By including a corrosion inhibitor in the solid lubricating coating, corrosion of the contact surfaces can be prevented to a certain extent by just the solid lubricating coating without forming a solid corrosion protective coating atop it. Therefore, it is preferable that the solid lubricating coating contain a corrosion inhibitor in an amount of at least 5 mass percent.

A water-insoluble liquid resin (a resin which is liquid at room temperature) increases the fluidity of the composition in a molten state, so it exhibits the effect of reducing problems during spray coating. If the amount of a liquid resin is small, it does not produce tackiness of the solid lubricating coating. A preferred liquid resin is selected from a polyalkyl methacrylate, polybutene, polyisobutene, and polydialkyl siloxane (a liquid silicone resin such as polydimethyl siloxane). Liquid polydialkyl siloxane also functions as a surface active agent.

In addition to the above, the matrix may contain small amounts of additives selected from a surface active agent, a coloring agent, an antioxidant, and the like. In addition, the matrix may contain extremely small amounts (at most 2 mass %) of an extreme pressure agent, a liquid lubricant, and the like.

A preferred composition of the matrix of a solid lubricating coating is as follows (in mass percent):

5-40% of a thermoplastic polymer, 5-30% of a wax, 5-30% of a metal soap, 0-50% of a corrosion inhibitor, 0-17% of a water-insoluble liquid resin, 0-2% each of a surface active agent, a colorant, and an antioxidant, 0-1% each of an extreme pressure agent and a liquid lubricant.

Two or more materials can be used for each of these components.

A more specific example of a preferable composition of the matrix of a solid lubricating coating is as follows (in mass percent):

5-40% of a polyethylene homopolymer, 5-30% of carnauba wax, 5-30% of zinc stearate, 5-50% of a corrosion inhibitor, 0-15% of a polyalkyl methacrylate, 0-2% of a polydimethyl siloxane, 0-1% of a coloring agent, 0-1% of an antioxidant.

A solid lubricant means a powder having lubricating properties. Solid lubricants can be roughly classified as follows:

(1) those which exhibit sliding properties due to their crystal structure which slides easily, such as those having a hexagonal laminar crystal structure (e.g., graphite, zinc oxide, and boron nitride), (2) those exhibiting lubricating properties due to having a reactive element in addition to their crystal structure (e.g., molybdenum disulfide, tungsten disulfide, graphite fluoride, tin sulfide, and bismuth sulfide), (3) those exhibiting lubricating properties due to chemical reactivity (e.g., certain thiosulfate compounds), and (4) those exhibiting lubricating properties due to plastic or viscoplastic behavior under frictional stresses (e.g., polytetrafluoroethylene (PTFE) and polyimides).

Any of these classes can be used, but class (2) is preferred. Lubricating powder of class (2) can be used by itself, but it is more preferable to use it in combination with lubricating powders of classes (1) and/or (4). However, molybdenum disulfide has somewhat low thermal stability, and graphite sometimes promotes corrosion, so it is preferable to use powders other than these.

In addition to a solid lubricant, the solid lubricating coating may contain an inorganic powder for controlling the sliding properties of the coating. Examples of such an inorganic powder are titanium dioxide and bismuth oxide. This inorganic powder may be contained in the solid lubricating coating in an amount up to 20 mass percent.

The solid lubricating coating is preferably formed using the hot melt method. This method is carried out by heating a coating composition (containing the above-described matrix and lubricating powder) so as to melt the matrix, and spraying the molten composition (of course only the matrix is in molten state) using a spray gun having a temperature maintaining function capable of maintaining a fixed temperature (normally a temperature which is the same as the temperature of the composition in a molten state). The heating temperature of the composition is preferably 10-50° C. above the melting point of the matrix.

The substrate which is coated (namely, the contact surface of the box) is also preferably preheated to a temperature higher than the melting point of the matrix. As a result, good coatability can be obtained. Alternatively, when the coating composition contains a small amount (such as at most 2 mass %) of a surface active agent such as polydimethylsiloxane, a good coating can be formed without preheating the substrate or by using a preheating temperature which is lower than the melting point of the matrix.

The coating composition is melted by heating in a tank equipped with a suitable stirring mechanism and it is supplied to the spraying head of a spray gun (maintained at a prescribed temperature) by a compressor through a metering pump before it is sprayed towards the substrate. The temperature at which the tank and the spraying head are maintained is adjusted in accordance with the melting point of the matrix.

The coating thickness of the solid lubricating coating is preferably in the range of 10-150 μm and more preferably it is in the range of 25-80 μm. If the coating thickness of the lubricating coating is too small, the lubricating properties of a threaded joint for pipes of course becomes inadequate, and galling easily occurs at the time of make-up and break-out. The solid lubricating coating has a certain degree of corrosion resistance, but if the coating thickness becomes too small, the corrosion resistance also becomes inadequate and the corrosion resistance of the contact surface of the box decreases.

On the other hand, making the coating thickness of the solid lubricating coating too large not only wastes lubricant but also runs counter to the object of preventing environmental pollution which is one of the objects of the present invention. In addition, in some cases, slipping occurs at the time of make-up, and make-up may become difficult.

When the solid lubricating coating and/or the solid corrosion protective coating is formed atop a contact surface having an increased surface roughness due to surface treatment, the coating thickness is preferably larger than Rz of the substrate. If this is not, it may not be possible to completely cover the substrate. The coating thickness when the substrate is roughened is the average value of the coating thickness of the overall coating calculated from the area, the mass, and the density of the coating.

The effects of the present invention will be illustrated by the following examples. Below, the contact surface including the threaded portion and the unthreaded metal contact portion of the pin will be referred to as the pin surface, and the contact surface including the threaded portion and the unthreaded metal contact portion will be referred to as the box surface. The surface roughness is Rz. Unless otherwise specified, percent in the examples means mass percent.

EXAMPLE 1

The pin surface and the box surface of a threaded joint for pipes made of a carbon steel (C: 0.21%, Si: 0.25%, Mn: 1.1%, P: 0.02%, S: 0.01%, Cu: 0.04%, Ni: 0.06%, Cr: 0.17%, Mo: 0.04%) and having an outer diameter of 17.78 cm (7 inches) and a wall thickness of 1.036 cm (0.408 inches) were subjected to the following surface treatment.

The pin surface was finished by machine grinding (surface roughness of 3 μm) and then immersed for 10 minutes in a zinc phosphating solution at 75-85° C. to form a zinc phosphate coating with a thickness of 8 μm (surface roughness of 8 μm). Atop this coating, a commercially available UV-curable resin coating composition (ThreeBond 3113B manufactured by ThreeBond Co., Ltd., a solventless UV-curable coating composition based on an epoxy resin) was applied, and the applied coating was cured by irradiation with UV radiation under the conditions indicated below to form a UV-cured resin coating having a thickness of 25 μm. This coating was colorless and transparent and enabled inspection of the threaded portion of the pin through the coating either with the naked eye or using a magnifying glass.

Conditions for UV irradiation

UV lamp: air-cooled mercury vapor lamp;

Output of UV lamp: 4 kW;

UV wavelength: 260 nm.

The box surface was finished by machine grinding (surface roughness of 3 μm) and immersed for 10 minutes in a manganese phosphating solution at 80-95° C. to form a manganese phosphate coating with a thickness of 12 μm (surface roughness of 10 μm). A lubricating coating composition having the composition indicated below was heated at 150° C. in a tank equipped with a stirrer to form a melt having a viscosity suitable for application. The box surface as treated in the above-described manner was preheated to 130° C. by induction heating, and the molten lubricating coating composition was applied thereto using a spray gun having a spray head capable of retaining heat. Upon cooling, a solid lubricating coating with a thickness of 35 μm was formed.

Composition of the lubricating coating composition:

9% polyethylene (homopolymer) (Licowax™ PE 520 manufactured by Clariant);

15% carnauba wax;

15% zinc stearate;

5% liquid polyalkyl methacrylate (Viscoplex™ 6-950 manufactured by Rohmax);

40% corrosion inhibitor (ALOX™ 606 manufactured by Lubrizol);

3.5% graphite fluoride;

1% zinc oxide;

5% titanium dioxide;

5% bismuth trioxide;

1% silicone (polydimehtylsiloxane); and antioxidant (manufactured by Ciba-Geigy) consisting of 0.3% Irganox™ L150 and 0.2% Iragafos™ 168.

Using the threaded joint which had the pin and box surfaces treated as described above, a repeated make-up and break-out test was performed by repeating make-up and break-out ten times at a make-up speed of 10 rpm with a make-up torque of 20 kN·m. After the tenth cycle of make-up and break-out, the contact surfaces of the pin and the box were examined for the occurrence of galling. Extremely good results in which no galling occurred during ten cycles of make-up and break-out were observed.

EXAMPLE 2

The pin surface and the box surface of the same threaded joint for pipes made of the same carbon steel as was used in Example 1 were subjected to the following surface treatment.

The pin surface was finished by machine grinding (surface roughness of 3 μm) and then immersed for 10 minutes in a zinc phosphating solution at 75-85° C. to form a zinc phosphate coating with a thickness of 8 μm (surface roughness of 8 μm). Atop this coating, a coating composition prepared by adding aluminum phosphite as a rust-preventing agent and polyethylene wax as a lubricant to an epoxy-acrylic resin-based UV-curable resin coating composition manufactured by Chugoku Marine Paint, Ltd. (solventless type) and containing, in mass %, 94% resin, 5% rust-preventing agent, and 1% lubricant was applied, and the applied coating was cured by irradiation with UV radiation under the conditions indicated below to form a UV-cured resin coating having a thickness of 25 μm. This coating was colorless and transparent and enabled inspection of the threaded portion of the pin through the coating either with the naked eye or using a magnifying glass.

Conditions for UV irradiation

UV lamp: air-cooled mercury vapor lamp;

Output of UV lamp: 4 kW;

UV wavelength: 260 nm.

The box surface was finished by machine grinding (surface roughness of 3 μm) and subjected to electroplating initially by Ni strike plating and then by Cu—Sn—Zn alloy plating to form plated coatings having a total plating thickness of 8 μm. A lubricating coating composition having the composition indicated below was heated at 120° C. in a tank equipped with a stirrer to form a melt having a viscosity suitable for application. The box surface as treated in the above-described manner was preheated to 120° C. by induction heating, and the molten lubricating coating composition was applied thereto using a spray gun having a spray head capable of retaining heat. Upon cooling, a solid lubricating coating with a thickness of 50 μm was formed.

Composition of the lubricating coating composition:

9% polyethylene (homopolymer) (Licowax™ PE 520 manufactured by Clariant);
15% carnauba wax;
15% zinc stearate;
5% liquid polyalkyl methacrylate (Viscoplex™ 6-950 manufactured by Rohmax);
40% corrosion inhibitor (NA-SUL™ Ca/W1935 manufactured by King Industries);
3.5% graphite fluoride;
1% zinc oxide;
5% titanium dioxide;
5% bismuth trioxide;
1% silicone (polydimehtylsiloxane); and
antioxidant (manufactured by Ciba-Geigy) consisting of 0.3% Irganox™ L150 and 0.2% Iragafos™ 168.

Using the threaded joint which had the pin and box surfaces treated as described above, a repeated make-up and break-out test was performed by repeating make-up and break-out ten times at a make-up speed of 10 rpm with a make-up torque of 20 kN·m. After the tenth cycle of make-up and break-out, the contact surfaces of the pin and the box were examined for the occurrence of galling. Extremely good results in which no galling occurred during ten cycles of make-up and break-out were observed.

EXAMPLE 3

The pin surface and the box surface of a threaded joint for pipes made of a 13Cr steel (C: 0.19%, Si: 0.25%, Mn: 0.9%, P: 0.02%, S: 0.01%, Cu: 0.04%, Ni: 0.11%, Cr: 13%, Mo: 0.04%) and having an outer diameter of 24.448 cm (9⅝ inches) and a wall thickness of 1.105 cm (0.435 inches) were subjected to the following surface treatment.

To the pin surface which had been finished by machine grinding (surface roughness of 3 μm), a coating composition prepared by adding aluminum phosphite as a rust-preventing agent, polyethylene wax as a lubricant, and a fluorescent pigment to the same UV-curable resin coating composition as used in Example 2 and containing, in mass %, 5% rust-preventing agent, 1% lubricant, 0.3% fluorescent pigment, and a remainder of resin was applied, and the applied coating was cured by irradiation with UV radiation under the conditions indicated below to form a UV-cured resin coating having a thickness of 25 μm. This coating was colorless and transparent and enabled inspection of the threaded portion of the pin through the coating either with the naked eye or using a magnifying glass. In addition, when the pin surface was irradiated with UV radiation, the coating became luminous in yellow color, and the appearance of the coating could readily be observed. As a result, it was confirmed that the coating was formed uniformly and evenly.

Conditions for UV irradiation

UV lamp: air-cooled mercury vapor lamp;
Output of UV lamp: 4 kW;
UV wavelength: 260 nm.

The box surface was finished by machine grinding (surface roughness of 3 μm) and subjected to electroplating initially by Ni strike plating and then by Cu—Sn—Zn alloy plating to form plated coatings having a total plating thickness of 8 μm. A lubricating coating composition having the composition indicated below was heated at 150° C. in a tank equipped with a stirrer to form a melt having a viscosity suitable for application. The box surface as treated in the above-described manner was preheated to 150° C. by induction heating, and the molten lubricating coating composition was applied thereto using a spray gun having a spray head capable of retaining heat. Upon cooling, a solid lubricating coating with a thickness of 40 μm was formed.

Composition of the lubricating coating composition:

10% polyethylene (homopolymer) (Licowax™ PE 520 manufactured by Clariant);
7% carnauba wax;
25% zinc stearate;
8% liquid polyalkyl methacrylate (Viscoplex™ 6-950 manufactured by Rohmax);
15% corrosion inhibitor (Halox™ SZP-391);
7% graphite fluoride;
2% PTFE;
1% boron nitride;
5% viscosity improver (Displerplast); and
5% microwax (Polyfluo™ 440Xn manufactured by MicroPowders).

Using the threaded joint which had the pin and box surfaces treated as described above, a repeated make-up and break-out test was performed by repeating make-up and break-out ten times at a make-up speed of 10 rpm with a make-up torque of 20 kN·m. After the tenth cycle of make-up and break-out, the contact surfaces of the pin and the box were examined for the occurrence of galling. Excellent results in which no galling occurred during ten cycles of make-up and break-out were observed.

Rust preventing properties which are also needed by a threaded joint for pipes were evaluated by preparing a coupon-shaped test piece (70 mm×150 mm×2 mm thick) of the same steel which had been subjected to the same surface treatment (preparatory treatment and the formation of a solid lubricating coating or a solid corrosion protective coating) as was employed for the box surface or the pin surface in each of the above examples and subjecting the test piece to a humidity test (200 hours at a temperature of 50° C. and a humidity of 98%). It was confirmed by this test that there was no occurrence of rust for any case.

The present invention has been described above with respect to embodiments which are considered to be preferred at the present time, but the present invention is not limited to the embodiments disclosed above. It is possible to make changes to an extent which is not contrary to the technical concept of the invention as understood from the claims and the specification as a whole, and a threaded joint employing such variations should be understood as being encompassed by the technical scope of the present invention.

For example, the above-described examples illustrate the present invention with respect to a threaded joint for pipes having an outer diameter of 7 inches. It was ascertained that the same effect as in the examples could be achieved with threaded joints for pipes having different outer diameters in the range of from 2⅜ inches to 14 inches or various steel compositions including from carbon steel to 13Cr steel and even high alloy steel (such as 25Cr steel), and with various types of threaded joints (for example, VAM TOP series manufactured by Sumitomo Metal Industries, Ltd. as one of VAM Connections).

The invention claimed is:

1. A threaded joint for pipes constituted by a pin and a box, each having a contact surface comprising a threaded portion and an unthreaded metal contact portion, characterized in that the threaded joint is formed by joining the pin having a contact surface consisting of a transparent solid corrosion protective coating based on a UV-curable resin to the box having a contact surface consisting of a solid lubricating coating which comprises 70~95 mass percent of a matrix and 5~30 mass percent of a lubricating powder and in which solid lubricants are dispersed in the matrix having a melting point of 80~320° C., wherein the thickness of the transparent solid corrosion protective coating is 5~50 μm and the transparent solid corrosion protective coating contains, in addition to the UV-curable resin, at least one additive selected from a pigment having an average particle size of 5 μm or less, a dye, and a fluorescent agent, each with a mass ratio of 0.05 at most with respect to the UV-curable resin.

2. A threaded joint for pipes as set forth in claim 1 wherein the transparent solid corrosion protective coating is formed from two or more layers each based on a UV-curable resin.

3. A threaded joint for pipes as set forth in claim 1 wherein the contact surface of at least one of the pin and the box previously undergoes preparatory surface treatment by a method selected from blasting, pickling, phosphate chemical conversion treatment, oxalate chemical conversion treatment, borate chemical conversion treatment, metallic plating, or a combination of two or more of these methods.

4. A threaded joint for pipes as set forth in claim 1 wherein the solid lubricating coating is formed by spray coating of a molten composition.

5. A threaded joint for pipes as set forth in claim 4 wherein the composition comprises a thermoplastic polymer, a wax, a metal soap, and a solid lubricant.

6. A threaded joint for pipes as set forth in claim 5 wherein the composition further contains a corrosion inhibitor.

7. A threaded joint for pipes as set forth in claim 5 wherein the composition further contains a corrosion inhibitor and a water-insoluble resin, which is liquid at room temperature.

8. A threaded joint for pipes as set forth in claim 1 wherein the transparent solid corrosion protective coating contains at least one additive selected from a lubricant, a fibrous filler, and a rust-preventing agent, in addition to the UV-curable resin.

9. A threaded joint for pipes as set forth in claim 8 wherein the lubricant is a wax.

10. A threaded joint for pipes as set forth in claim 1 wherein the threaded joint for pipes is used for connecting pipes which are for use in the excavating of oil wells and gas wells.

* * * * *